United States Patent
Al-Amoudi et al.

(10) Patent No.: US 9,499,742 B2
(45) Date of Patent: Nov. 22, 2016

(54) METHOD FOR ENHANCING STRENGTH AND DURABILITY OF WEAK SOILS

(71) Applicant: KING FAHD UNIVERSITY OF PETROLEUM AND MINERALS, Dhahran (SA)

(72) Inventors: Omar Saeed M. Baghabra Al-Amoudi, Dhahran (SA); Abdullah Ahmed Khaled Al-Homidy, Najran (SA); Mohammed Maslehuddin, Dhahran (SA); Tawfik Abdo Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 59 days.

(21) Appl. No.: 14/572,609

(22) Filed: Dec. 16, 2014

(65) Prior Publication Data

US 2016/0168460 A1 Jun. 16, 2016

(51) Int. Cl.
*C09K 17/10* (2006.01)
*E01C 3/04* (2006.01)

(52) U.S. Cl.
CPC *C09K 17/10* (2013.01); *E01C 3/04* (2013.01)

(58) Field of Classification Search
None
See application file for complete search history.

(56) References Cited

U.S. PATENT DOCUMENTS

| | | | |
|---|---|---|---|
| 5,672,146 A | 9/1997 | Aota | |
| 5,897,704 A | 4/1999 | Baglin | |
| 8,603,240 B2 | 12/2013 | Morano et al. | |
| 2007/0266906 A1* | 11/2007 | Garcia | C04B 22/0026 106/817 |
| 2013/0192495 A1* | 8/2013 | Al-Mehthel | C04B 7/153 106/791 |
| 2014/0165880 A1* | 6/2014 | Fares | C04B 18/0481 106/709 |

OTHER PUBLICATIONS

"Subbase Stabilization". Terratech. Oct. 2010. http://www.terratechinfo.com/images/stories/Projects/Subbase_Stabilization/TT_Subbase_Stabilization_Proj_Report_10_11c.pdf.*
Yildirim, Irem Zeynep; Prezzi, Monica. "Use of Steel Slag in Subgrade Applications". Oct. 2009. Retrieved from http://docs.lib.purdue.edu/cgi/viewcontent.cgi?article=2623&context=jtrp.*
Mirdamadi, A., Shamsabadi, S., Kashi, M., Nemati, M., and Shekarchizadeh, M. "Geotechnical Properties of Controlled Low Strength Materials (CLSM) Using Waste Electric Arc Furnace Dust (EAFD)". 2009.*
"PCA Manual: Ch 12". PCA. 2002 (see PDF properties, created in 2002).*
Zemajtis, Jerzy Z. "Role of Concrete Curing". Jan. 2014. https://web.archive.org/web/20140112022800/http://www.cement.org/for-concrete-books-learning/concrete-technology/concrete-construction/curing-in-construction.*
Wahhab, H.I. Al Abdul; Asi, I.M. "Improvement of Marl and Dune Sand for Highway Construction in Arid Areas". Building and Environment. vol. 12, No. 3, pp. 271-279. 1996.*
Al-Abdul Wahhab et al., "*Improvement of marl and dune sand for highway construction in arid areas*," Building and Environment, vol. 32, Issue 3, pp. 271-279, May 1997. (2 pgs).

(Continued)

*Primary Examiner* — Karam Hijji
(74) *Attorney, Agent, or Firm* — Richard C. Litman (57) ABSTRACT

The method for enhancing strength and durability of weak soils includes the steps of selecting a weak soil, such as marl or dune sand, mixing the weak soil with 2% cement by weight and between 5% and 30% by weight of Electric Arc Furnace Dust (EAFD) to form a dry mixture, mixing the dry mixture with water to form a substantially homogenized mixture, and curing the homogenized mixture, wherein curing can include the step of sealing the homogenized mixture in an environment having a temperature between 19° C. and 25° C., inclusive, for seven days.

7 Claims, 6 Drawing Sheets

(56) References Cited

OTHER PUBLICATIONS

M.H. Al-Malack et al., "Stabilization of Indigenous Saudi Arabian soils using fuel oil flyash," *Journal of King Saud University—Engineering Sciences* (2014). (9 pgs).

Gregory Paul Makusa, "State of the art review soil stabilization methods and materials in engineering practice," *Department of Civil, Environmental and Natural Resources Engineering*, Division of Mining and Geotechnical Engineering, Lulea University of Technology, Lulea, Sweden, 2012. (38 pgs).

* cited by examiner

METHOD FOR ENHANCING STRENGTH AND DURABILITY OF WEAK SOILS

BACKGROUND OF THE INVENTION

1. Field of the Invention

The present invention relates generally to material enhancement, and more particularly to a method for enhancing the strength and durability of weak soils.

2. Description of the Related Art

Over the last several decades, the increase in construction activity worldwide, resulting from the need for new and improved infrastructure, has resulted in an increase in industrial waste materials, such as Electric Arc Furnace Dust (EAFD), a waste material produced during the production of steel, which is often considered a hazardous waste material due to its heavy metal content. As such, there is a need to develop economic and environmentally friendly methodologies for the disposal of industrial waste materials, including EAFD. Moreover, the increase in construction has also led to a significant consumption of construction materials, such as weak soils including marl and dune sand, which, in turn, leads to a depletion of quality materials. Accordingly, the strength and durability of construction materials, such as weak soils, need to be improved to conserve quality materials for use by future generations.

Many methods are currently available to stabilize weak soils. However, these methods typically require large quantities of cement or lime, whose production is not only costly, but also harmful to the environment due to an increase in greenhouse gases produced and emitted into the environment. Therefore, there is both an economic and environmental need to recycle industrial waste materials, such as EAFD, and enhance the properties of construction materials, such as weak soil, so that they can be used as base and sub-base material for flexible pavements, such as asphalt, and for rigid pavements, such as concrete.

Thus, a method for enhancing the strength and durability of weak soils solving the aforementioned problems is desired.

SUMMARY OF THE INVENTION

The method for enhancing the strength and durability of weak soils, such as marl and dune sand, includes the steps of selecting a weak soil, mixing the weak soil with 2% cement by weight of dry soil and between 5% and 30% by weight Electric Arc Furnace Dust (EAFD) to form a dry mixture, mixing the dry mixture with water to form a substantially homogenized mixture, and curing the homogenized mixture, wherein curing the homogenized mixture can include the step of sealing the homogenized mixture in an environment having a temperature that can range from between 19° C. to 25° C., inclusive, for seven days.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

The method for enhancing the strength and durability of weak soils, such as marl or dune sand, includes the steps of selecting a weak soil, mixing the weak soil with 2% cement by weight, such as Portland cement, and between 5% and 30% by weight of EAFD to form a dry mixture, mixing the dry mixture with sufficient water to form a substantially homogenized mixture, and curing the homogenized mixture, wherein curing the homogenized mixture can include the step of sealing the homogenized mixture in an environment having a temperature that can range from between 19° C. to 25° C., inclusive, for seven days.

In order to test both the strength and durability of the marl mixed with 2% cement and EAFD ranging from 5% to 30%, inclusive, and the strength and durability of dune sand mixed with 2% cement and EAFD ranging from 5% to 30%, inclusive, different specimens of marl and dune sand were prepared, each sample having a different amount of EAFD content (%) combined with 2% cement. Each sample of marl and dune sand was tested to determine the UCS, soaked CBR, durability, and leaching characteristics.

The marl that was tested had a specific gravity of 2.69. Based on the analyses conducted according to the American Society for Testing and Materials (ASTM) D 423 and ASTM D 424 procedures, which can evaluate the Atterberg limits of the marl by passing the marl through an ASTM sieve #40, the marl was classified as non-plastic marl. A further analysis, utilizing both wet and dry techniques, in accordance with the procedures outlined in ASTM D 422, of the grain-size distribution of the marl indicated that the marl used can be classified as sandy marl (SM) according to the Unified Soil Classification System (USCS) and as A-3, non-plastic marl according to the American Association of State Highway and Transportation Officials (AASHTO). The mineralogical composition of the non-plastic marl, as determined by passing specimens of non-plastic marl through a ASTM sieve #10 and utilizing a Rigaku Ultima IV X-ray diffractometer, included dolomite in the range of about 62%, quartz in the range of about 30%, and calcite in the range of about 8%.

As determined in accordance with ASTM D 854, the specific gravity of the EAFD used in testing was 2.76. Further, the chemical composition of EAFD included iron in the range of about 34%, zinc in the range of about 10%, calcium in the range of about 9.4%, and silicone in the range of about 2.4%.

By way of operation, in Step (1), the weak soil is selected. In Step (2), the weak soil is mixed with 2% cement by weight and the EAFD content, in the range of between 5% and 30% by weight, inclusive, in a dry state to form a dry mixture. It is to be noted that the weak soil can be mixed with the 2% cement and the desired EAFD content for approximately one minute. In Step (3), the dry mixture is mixed with a sufficient volume of water to form a substantially homogenized mixture. It is to be noted that the dry mixture can be mixed with water for approximately three minutes until a substantially homogenized material is formed. In Step (4), the homogenized mixture is cured, such as by sealing the homogenized mixture in an environment having a temperature that can range from between 19° C. to 25° C., inclusive, for seven days.

Figure 1:
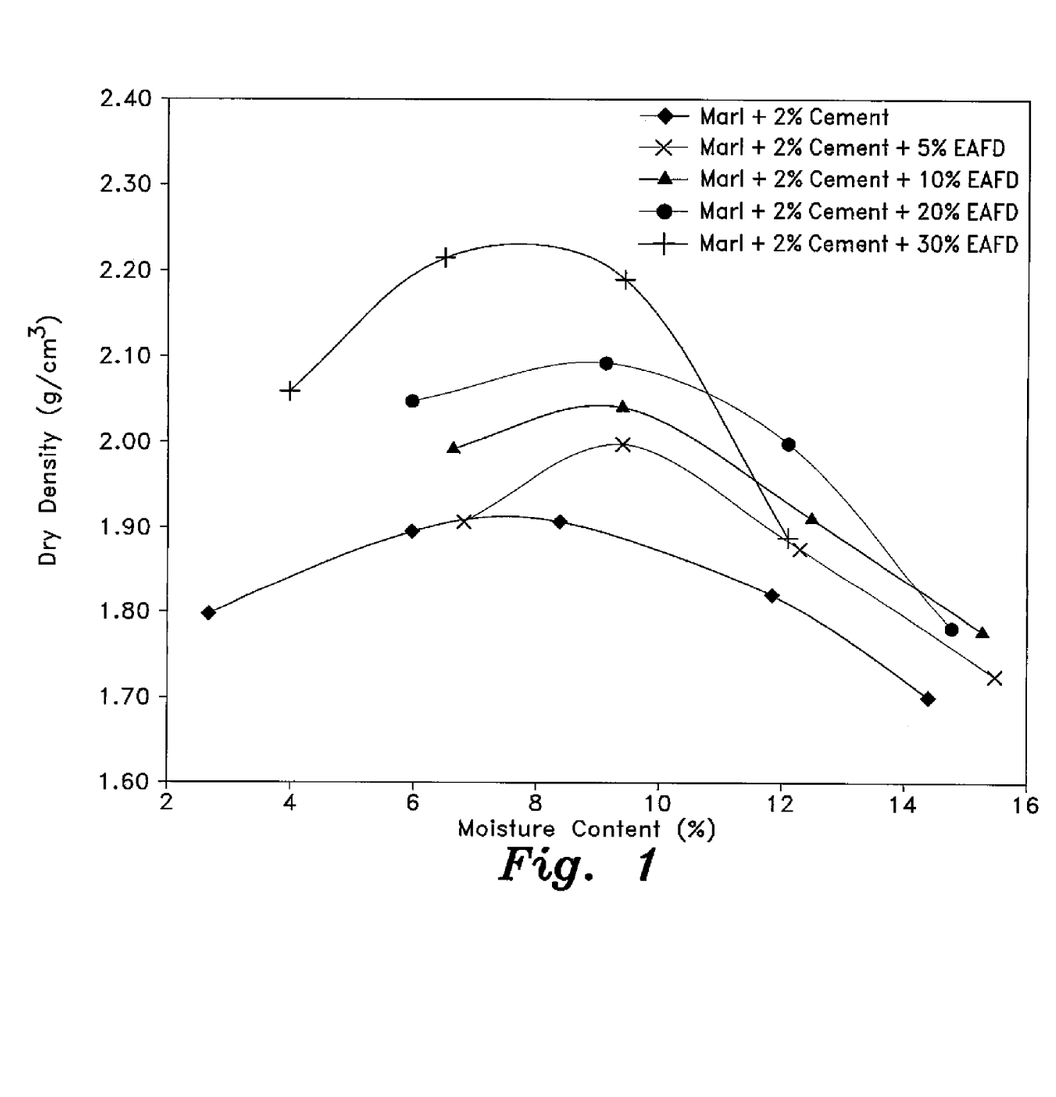
FIG. 1 is a graph illustrating the relationship between dry density (g/cm$^3$) and moisture content (%) for marl mixed with 2% cement and EAFD ranging from 0% to 30%, inclusive.
Figure 4:
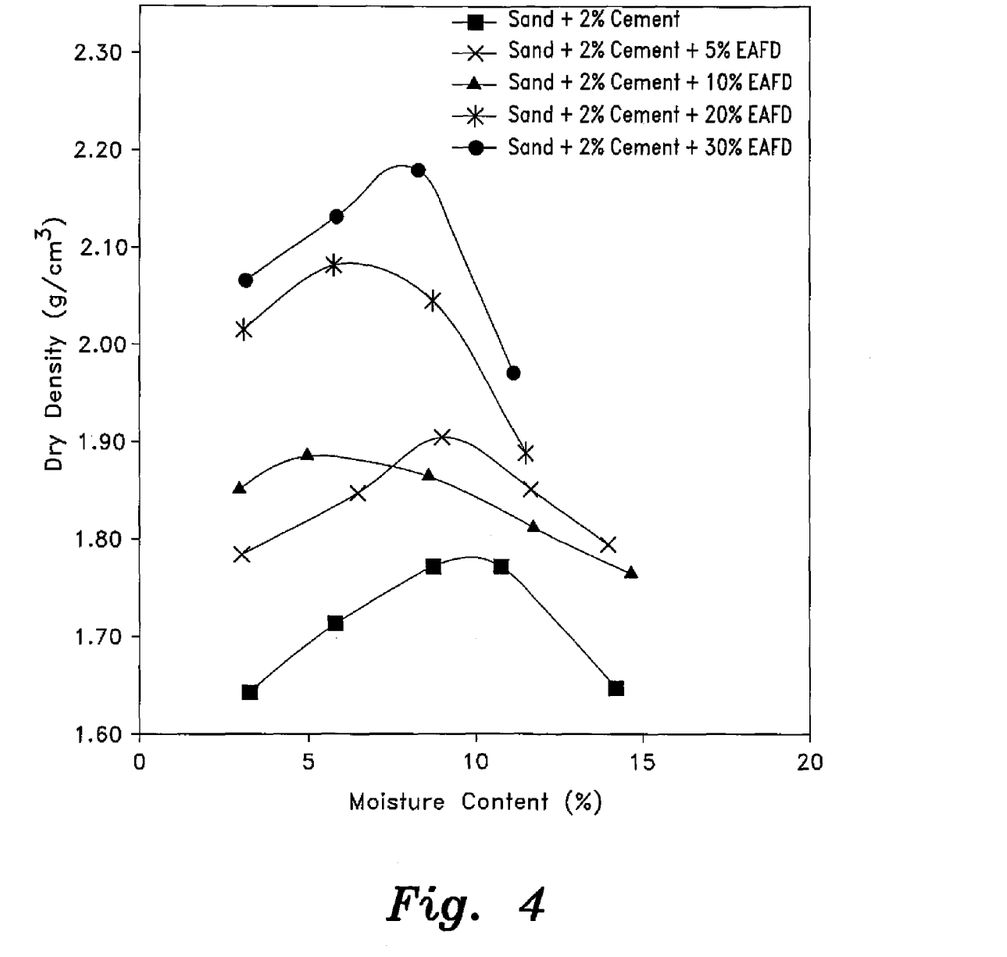
FIG. 4 is a graph illustrating the relationship between dry density (g/cm$^3$) and moisture content (%) for dune sand mixed with 2% cement and EAFD ranging from 0% to 30%, inclusive.

The optimum water content and the maximum dry density were determined using the modified Procter compaction test (ASTM D 1557). The test was performed on non-plastic marl with 2% cement and varying quantities of EAFD content (%), between 5% and 30%, inclusive. As illustrated in FIG. 1, the dry density of non-plastic marl with 2% cement and varying quantities of EAFD content (%), between 5% and 30%, inclusive, is greater than the dry density of the non-plastic marl having 2% cement only. Further, as illustrated in FIG. 4, the density of dune sand with 2% cement and varying quantities of EAFD content (%), between 5% and 30%, inclusive, is greater than the density of dune sand having 2% cement only.

Figure 2:
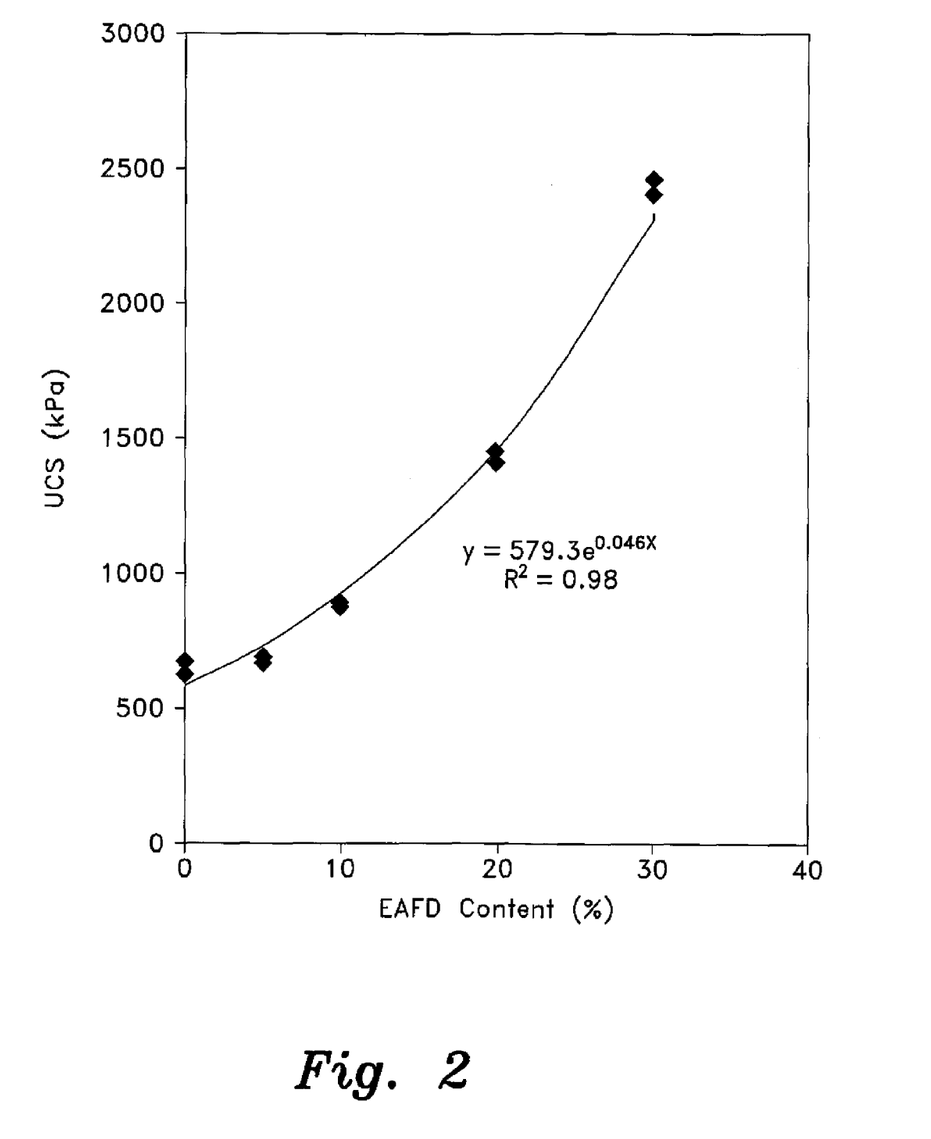
FIG. 2 is a graph illustrating the relationship between the EAFD content (%), ranging from 0% to 30%, inclusive, in marl having 2% cement and the unconfined compressive strength (UCS) of marl.

The UCS was measured in accordance with ASTM D 2166. The weak soil and 2% cement mixture having EAFD, in different quantities between 5% and 30%, inclusive, were mixed with optimum moisture content to form a homogenized mixture. The homogenized mixture was then compacted in cylindrical molds having dimensions of 100 mm in diameter and 200 mm high as per ASTM D 1557. The specimens were then cured for seven days under sealed conditions in the laboratory before evaluating their UCS Referring to FIG. 2, the UCS of the non-plastic marl having 2% cement and EAFD content (%) between 0% and 30%, inclusive, was 644 kPa, 676 kPa, 876 kPa, 1,427 kPa, and 2,430 kPa, respectively. As such, these results not only illustrate that the incorporation of 2% cement and EAFD increases the compressive strength of non-plastic marl, but also illustrate that as the EAFD content (%) increases from 0% to 30%, so does the UCS of the non-plastic marl. It is to be noted that the combination of non-plastic marl with 2% cement and 20% EAFD meets the minimum strength requirement of 1,380 kPa for the soil to be used as a sub-base course in rigid pavements. Also, non-plastic marl combined with 2% cement and 30% EAFD satisfies the minimum strength (1,725 kPa) required for sub-base course in flexible pavements.

Figure 5:
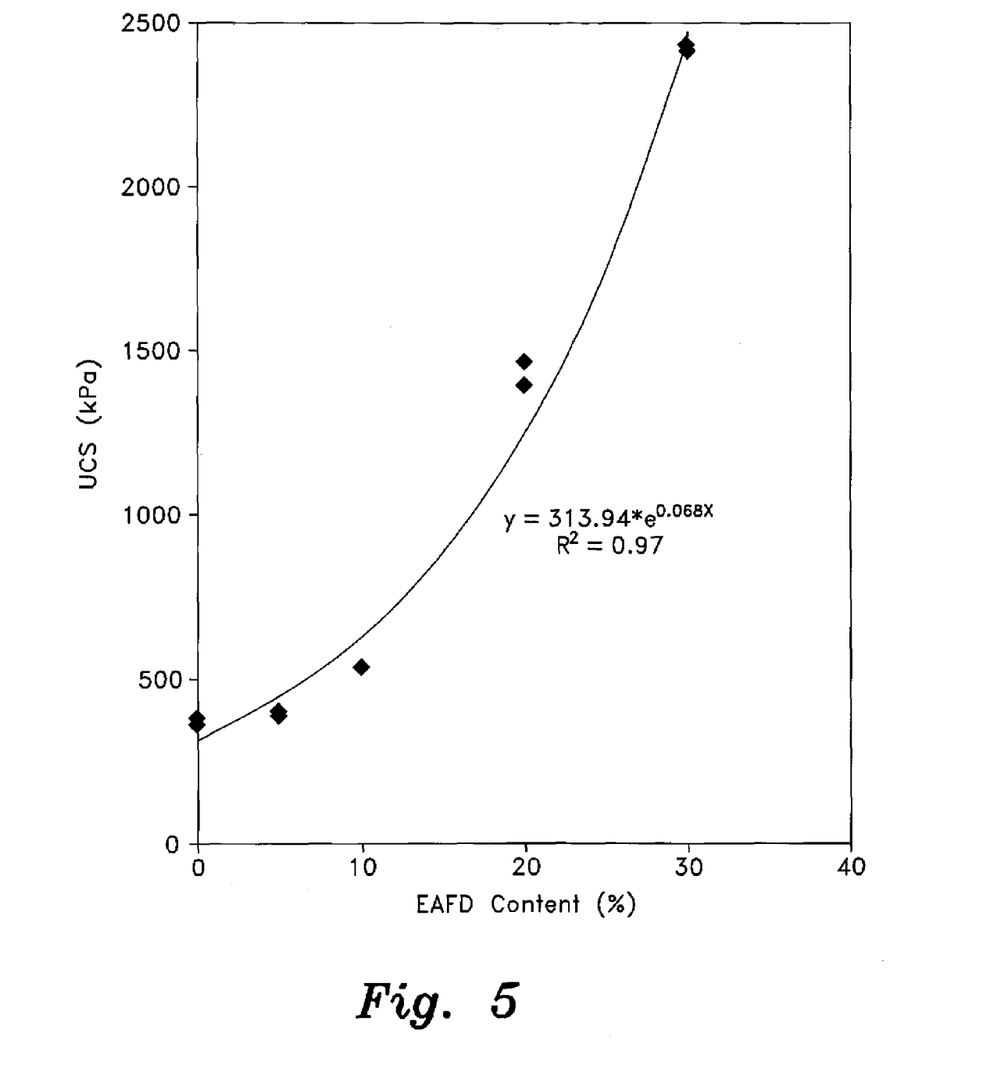
FIG. 5 is a graph illustrating the relationship between the EAFD content (%), ranging from 0% to 30%, inclusive, in dune sand having 2% cement and the UCS of dune sand.

Referring to FIG. 5, the UCS of dune sand having 2% cement and EAFD content (%) between 0% and 30%, inclusive, was 369 kPa, 392 kPa, 532 kPa, 1,427 kPa, and 2,419 kPa, respectively. As such, these results not only illustrate that the incorporation of 2% cement and EAFD increases the compressive strength of dune sand, but also illustrate that as the EAFD content (%) increases from 0% to 30%, so does the compressive strength of the dune sand. It is to be noted that dune sand with 2% cement plus 20% or 30% EAFD satisfies the minimum strength requirements of 1,380 kPa and 1,725 kPa, respectively, for sub-base course in rigid pavement and flexible pavement, respectively.

The soaked CBR test was performed on both untreated and treated weak soil specimens in accordance with ASTM D 1883. After preparation, the specimens were kept sealed for seven days in an environment having the temperature between 19° C. to 25° C., inclusive. The specimens were then submerged in water for approximately 96 hours to simulate field conditions, such as the fluctuation in the groundwater table, and then tested for CBR.

Figure 3:
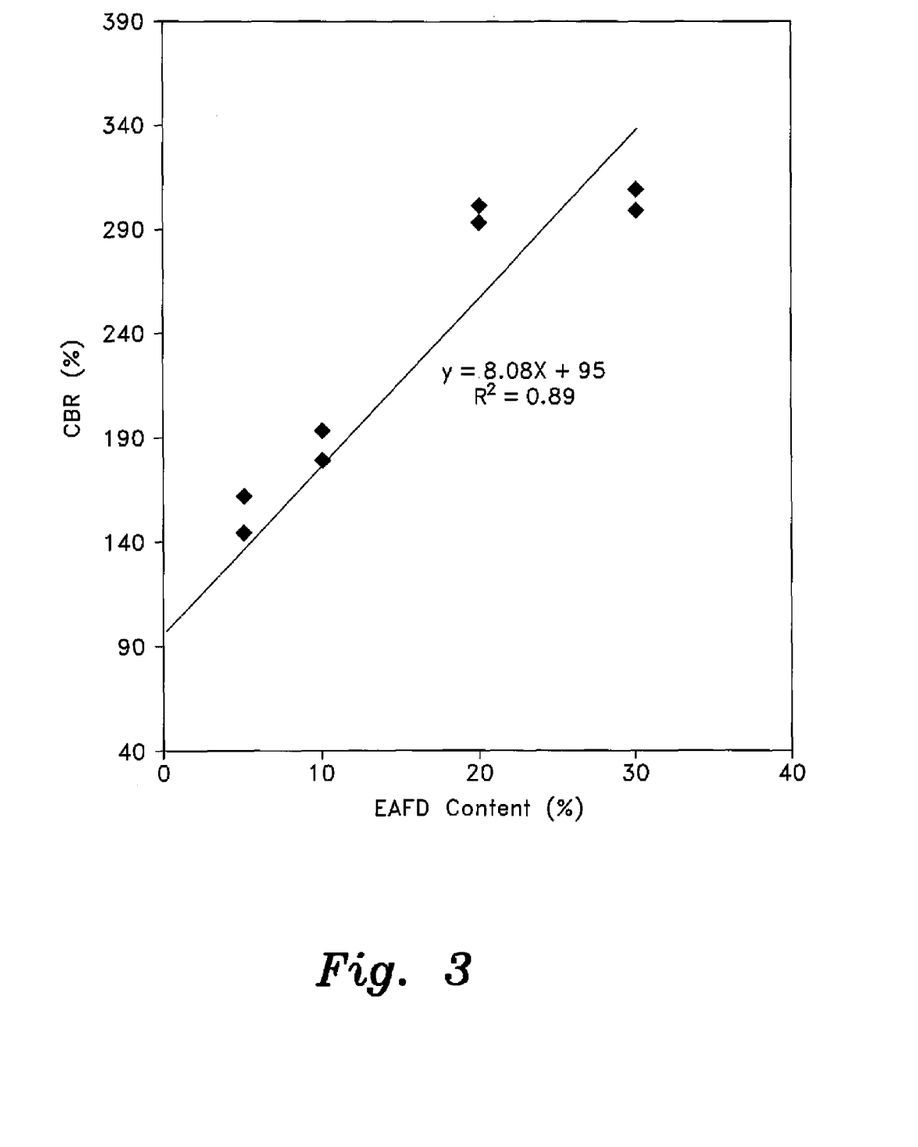
FIG. 3 is a graph illustrating the relationship between the EAFD content (%), ranging from 0% to 30%, inclusive, in marl having 2% cement and the California bearing ratio (CBR) of marl.

Referring to FIG. 3, the soaked CBR of non-plastic marl with 2% cement and EAFD between 0% and 30%, inclusive, was 60%, 153%, 186%, 297%, and 304%, respectively. As such, the CBR increases with the increasing quantity of EAFD. It is to be noted that the CBR of all the mixtures was more than 50%, the required CBR for the base course in pavements.

Figure 6:
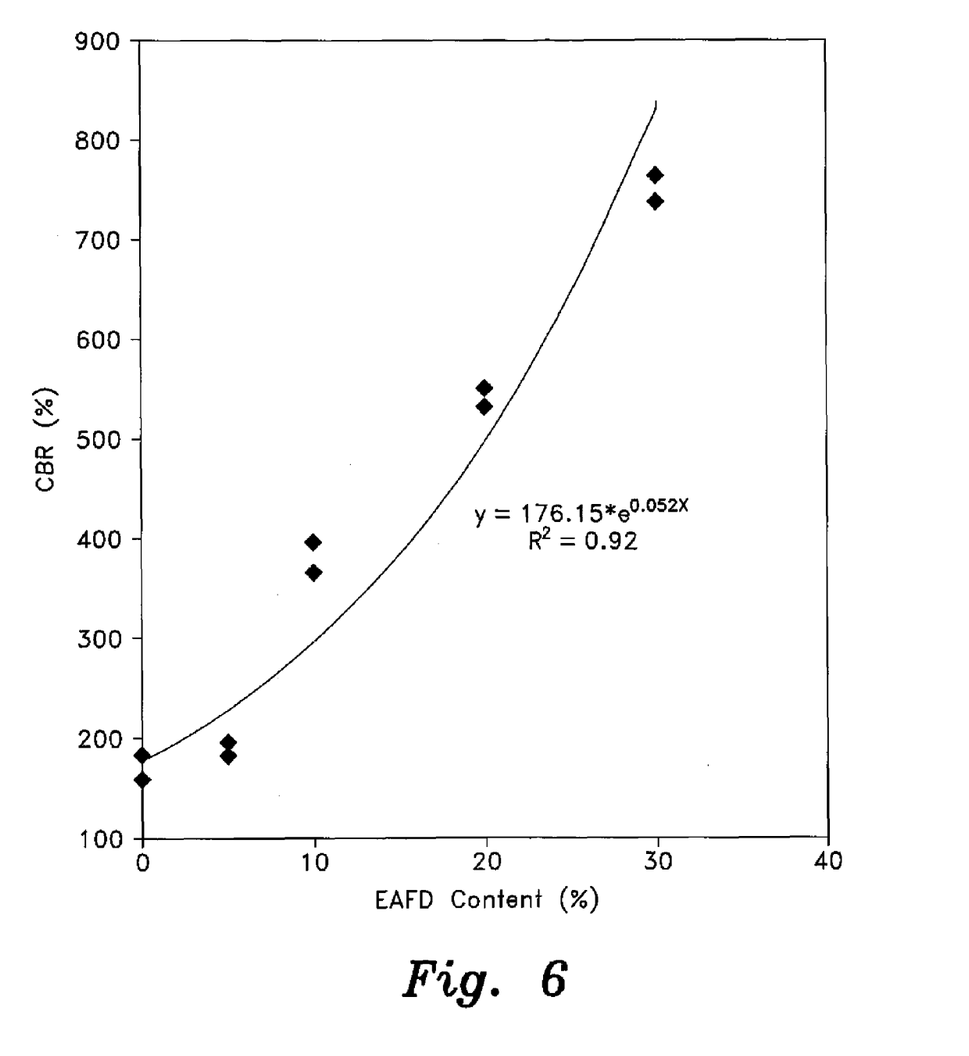
FIG. 6 is a graph illustrating the relationship between the EAFD content (%), ranging from 0% to 30%, inclusive, in dune sand having 2% cement and CBR of dune sand.

Referring to FIG. 6, the soaked CBR of dune sand having 2% cement and EAFD between 0% and 30%, inclusive, was 171%, 188%, 380%, 541%, and 750%, respectively. As such, the CBR increases with the increasing quantity of EAFD. It must be noted that the CBR of all the mixtures was more than 50%, the required CBR for the base course in pavements.

It is to be noted that moisture, combined with temperature, can produce wet and dry cycles in soil, as well as freeze and thaw cycles. The stabilized soils need to be strong and should maintain stability and durability to resist physical loads under cyclic environmental loading and different exposure conditions. Consequently, the maximum allowable weight loss is 14% according to the Portland Cement Association (PCA), and 11% according to the US Corps of Engineers (USCE), for soils classified as poorly graded sand (SP) and for soils having a plasticity index (PI) of less than 10, respectively.

The durability of the treated weak soils was assessed in accordance with ASTM D 559, in which specimens of weak soil mixtures were compacted at optimum moisture content, sealed, and cured for seven days in an environment having a temperature between 19° C. to 25° C., inclusive. After curing, the specimens were exposed to twelve alternate wet and dry cycles, and the weight loss of the specimens was measured and recorded as a measure of durability. The durability data indicated that non-plastic marl having 2% cement and at least 20% EAFD fulfilled the durability requirements of both PCA and USCE.

Similarly, the weight loss was 9.1% with respect to dune sand having 2% cement and 20% EAFD, while it was 7.2% with respect to dune sand having 2% cement and 30% EAFD. These results indicate that dune sand stabilized with 20% EAFD and 2% cement, or 30% EAFD and 2% cement, can be used for sub-base course in rigid and flexible pavements, respectively, from a strength and durability perspective.

The Toxicity Characteristic Leaching Procedure (TCLP) indicated that the concentration of cadmium and lead in non-plastic marl stabilized with 2% cement and 20% EAFD was 0.58 mg/l and 0.12 mg/l, respectively, while the concentration of these metals in non-plastic marl stabilized with 2% cement and 30% EAFD was 0.67 mg/l and 0.17 mg/l, respectively. The allowable concentrations of cadmium and lead, according to the US EPA are 1 mg/l and 5 mg/l, respectively. This indicates that the heavy metals in EAFD do not leach out into the groundwater from the stabilized soils.

Similarly the TCLP indicated that the concentration of cadmium for dune sand having 2% cement and 20% or 30% EAFD was 0.819 mg/l and 0.969 mg/l, respectively, thereby complying with the above-stated U.S. EPA standards.

It is to be understood that the present invention is not limited to the embodiments described above, but encompasses any and all embodiments within the scope of the following claims.

We claim:

1. A method for enhancing strength and durability of weak soils, consisting of the steps of:
    selecting a weak soil;
    mixing the weak soil with cement and Electric Arc Furnace Dust (EAFD) to form a dry mixture, the dry mixture consisting of the weak soil, the cement and the EAFD, the cement is in an amount of 2 wt % of the dry soil and the EAFD is in the amount of between 5 wt % and 30 wt % of the dry soil;
    mixing the dry mixture with water to form a substantially homogenized mixture; and
    curing the homogenized mixture.

2. The method for enhancing strength and durability of weak soils according to claim 1, wherein the weak soil comprises marl.

3. The method for enhancing strength and durability of weak soils according to claim 1, wherein the weak soil comprises non-plastic marl.

4. The method for enhancing strength and durability of weak soils according to claim 1, wherein the weak soil comprises dune sand.

5. The method for enhancing strength and durability of weak soils according to claim 1, wherein the cement comprises Portland cement.

6. The method for enhancing strength and durability of weak soils according to claim 1, wherein the EAFD is in an amount of 20 wt % of the dry soil, whereby the enhanced weak soil is suitable for use as a sub-base for asphalt pavement.

7. The method for enhancing strength and durability of weak soils according to claim 1, wherein the EAFD is in an amount of 30 wt % of the dry soil, whereby the enhanced weak soil is suitable for use as a sub-base for concrete pavement.

* * * * *